United States Patent [19]

Ryham

[11] Patent Number: 4,864,830

[45] Date of Patent: Sep. 12, 1989

[54] AIR CONDITIONING PROCESS AND APPARATUS

[75] Inventor: Rolf Ryham, Princeton, N.J.

[73] Assignee: Ahlströmföretagen Svenska AB, Norrköping, Sweden

[21] Appl. No.: 206,002

[22] Filed: Jun. 13, 1988

[51] Int. Cl.⁴ ............................................. F25D 17/06
[52] U.S. Cl. .................................... 62/94; 62/112; 62/271; 62/494
[58] Field of Search ............... 62/476, 494, 94, 271, 62/112

[56] References Cited

U.S. PATENT DOCUMENTS

| | | | |
|---|---|---|---|
| 2,287,441 | 6/1942 | McGinnis | 62/494 X |
| 3,417,574 | 12/1968 | Kelley | 62/271 X |
| 3,742,728 | 7/1973 | Mamiya | 62/476 |
| 3,810,950 | 5/1974 | Woodle | 62/94 X |
| 3,817,050 | 6/1974 | Alexander et al. | 62/476 X |
| 3,831,397 | 8/1974 | Mamiya | 62/476 |
| 4,164,125 | 8/1979 | Griffiths | 62/271 X |
| 4,171,620 | 10/1979 | Turner | 62/271 X |
| 4,197,713 | 4/1980 | Bulang | 62/94 |
| 4,197,714 | 4/1980 | Bradshaw | 62/271 X |
| 4,222,244 | 9/1980 | Meckler | 62/271 X |
| 4,259,849 | 4/1981 | Griffiths | 62/94 X |
| 4,313,312 | 2/1982 | Ito et al. | 62/94 X |
| 4,635,446 | 1/1987 | Meckler | 62/271 |
| 4,691,530 | 9/1987 | Meckler | 62/271 X |
| 4,748,830 | 6/1988 | Oouchi et al. | 62/476 |

Primary Examiner—Lloyd L. King
Attorney, Agent, or Firm—Cohen, Pontani & Lieberman

[57] ABSTRACT

An air conditioning process and apparatus with absorption of water vapor in a circulating absorption liquid containing an aqueous salt solution. The absorption liquid to be supplied to the absorber is cooled by indirect contact with a circulating water stream in a heat exchanger. The circulating water is expanded at reduced pressure to release water vapor and lower the temperature of the water. The water vapor is thereafter absorbed in absorption liquid from the absorber.

12 Claims, 3 Drawing Sheets

AIR CONDITIONING PROCESS AND APPARATUS

FIELD OF THE INVENTION

The present invention relates to an air conditioning process and apparatus in which moisture is removed from air and air is cooled by an absorption liquid in two absorption stages.

BACKGROUND AND SUMMARY OF THE INVENTION

According to the present invention, air is dehumidified by direct contact with a water-absorbing liquid. An aqueous solution of easily soluble salts such as, for example, potassium acetate, sodium acetate, potassium carbonate, calcium chloride, lithium chloride, lithium bromide and the like or mixtures thereof is suitably used as the absorption liquid. These concentrated salt solutions exhibit great affinity to water. Consequently, the water vapor pressure above the solution, is correspondingly low.

If air at a certain temperature and a certain relative humidity is brought into contact with such a concentrated salt solution, water vapor from the air is absorbed by the solution as long as the salt concentration results in a lower water vapor pressure than that present during the state of equilibrium.

When air is dehumidified by absorption of water vapor, the absorption liquid will become increasingly diluted by the absorbed water. As the only volatile component of the absorption liquid is water, it can be regenerated by evaporation. This is usually accomplished by heating the absorption liquid to a temperature at which the water vapor pressure thereof exceeds the atmospheric pressure or pressure surrounding it thus causing the water to evaporate. Concentrated salt-water solutions suitable for absorption purposes exhibit a high boiling point elevation. Generally, the dilution of the absorption liquid by absorption of water vapor is relatively small. Consequently, evaporation in more than one stage or effect is usually not feasible so that the diluted absorption liquid is usually regenerated by evaporation in a single stage evaporator.

To regenerate the absorption liquid in an evaporator an amount of energy corresponding to the heat of vaporization is required. Additional energy is needed to heat the liquid to its boiling temperature and to compensate for heat losses and the like.

The present invention utilizes the low water vapor pressure above a concentrated water-salt solution to absorb a saturated water vapor in the salt solution at a higher temperature.

According to the present invention, an absorption liquid which is used in an absorber having one or more absorption stages or zones in an air conditioning system is cooled by a circulating water stream in a heat exchanger. The water stream which takes up and carries away heat from the heat exchanger is caused to expand at reduced pressure, for example, in a flash tank. An amount of water vapor corresponding to the temperature drop, i.e. the absolute pressure is then released. The water vapor released by expansion in the flash tank is introduced into a condenser having surfaces which are continuously wetted by a water-absorbing salt solution. The salt solution used in the condenser may be from any suitable source, but preferably is the salt solution used as an absorption liquid in the absorber and which is circulated through and cooled in the heat exchanger. Water vapor is absorbed by the salt solution or condensed into it as long as the water vapor pressure above the salt solution is lower than the pressure of the vapor released by the expansion from the flash tank. It is thus possible to condense water vapor in a salt solution having a temperature which is about 20° C. or more above the saturation temperature of the water vapor.

It is, accordingly, an object of the present invention to provide a method of producing low air temperatures and low absolute humidities in air conditioning systems.

It is another object of the present invention to improve the efficiency and to lower the energy consumption of air conditioning systems using absorption technique.

These and other objects and advantages of the present invention will be apparent from the following detailed description and the accompanying drawing.

DESCRIPTION OF THE PRESENTLY PREFERRED EMBODIMENT

Figure 1:
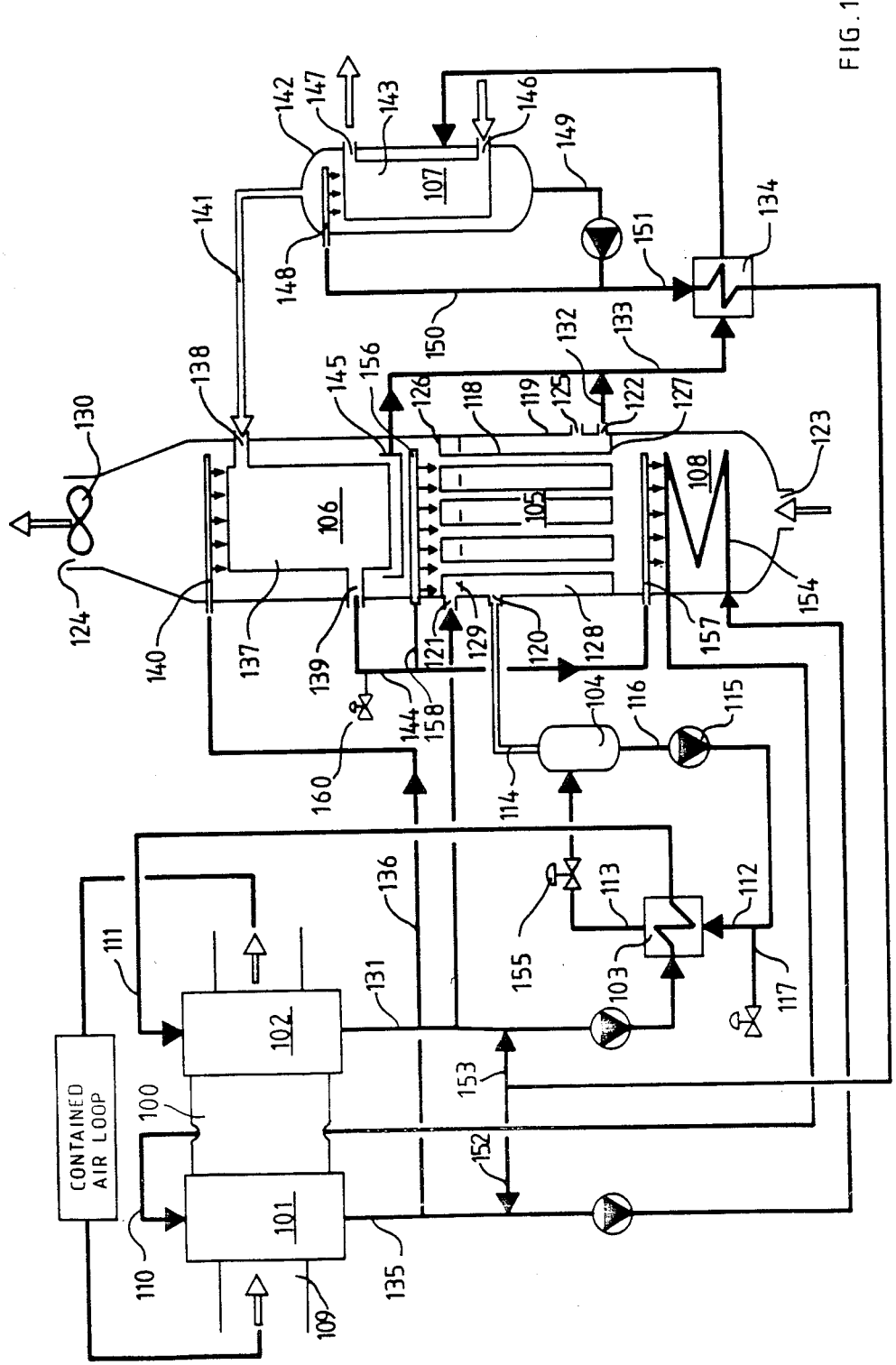
FIG. 1 is a schematic flow diagram illustrating an air conditioning system in which a water-absorbing salt solution is used for dehumidification and cooling of air in two absorption stages.

As shown in FIG. 1 the air conditioning system comprises an absorber 100 having two absorption zones or stages 101 and 102, a heat exchanger 103, a flash tank 104, a first condenser 105, a second condenser 106, an evaporator 107, a cooler 108 and a second heat exchanger 134. It will be understood that although FIG. 1 shows absorption zones 101 and 102 as separate units, both absorption zones could be incorporated in one apparatus. Also, more than one absorber could be used.

Air flowing through a conduit 109 is brought into direct contact with at least a part of the concentrated absorption liquid supplied through conduit 110 to absorption stage 101. A second part of the concentrated absorption liquid fed to absorption stage 102 is first cooled in heat exchanger 103 by indirect contact with a circulating water stream taking up heat and carrying it away. As in shown in FIG. 1, absorption liquid may be circulated through absorption stage 102 and heat exchanger 103 thus leading to absorption at constant relative humidity. Water is introduced into heat exchanger 103 through conduit 112 and is discharged therefrom through conduit 113. The heated water discharged from heat exchanger 103 is passed via pressure control device such as restriction valve 155, to flash tank 104 in which the pressure is sufficiently low so as to cause the release of water vapor therefrom. Evaporation of water requires heat which is removed from the water causing the temperature thereof to decrease. An amount of vapor corresponding to the temperature drop of the water is released. The vapor is thereafter discharged from flash tank 104 and passed to the first condenser 105 through conduit 114. The remaining water is recirculated to heat exchanger 103 preferably by a pump 115 through conduit 116. As water is continuously consumed by evaporation, additional water is supplied through conduit 117 as needed.

Figure 2:
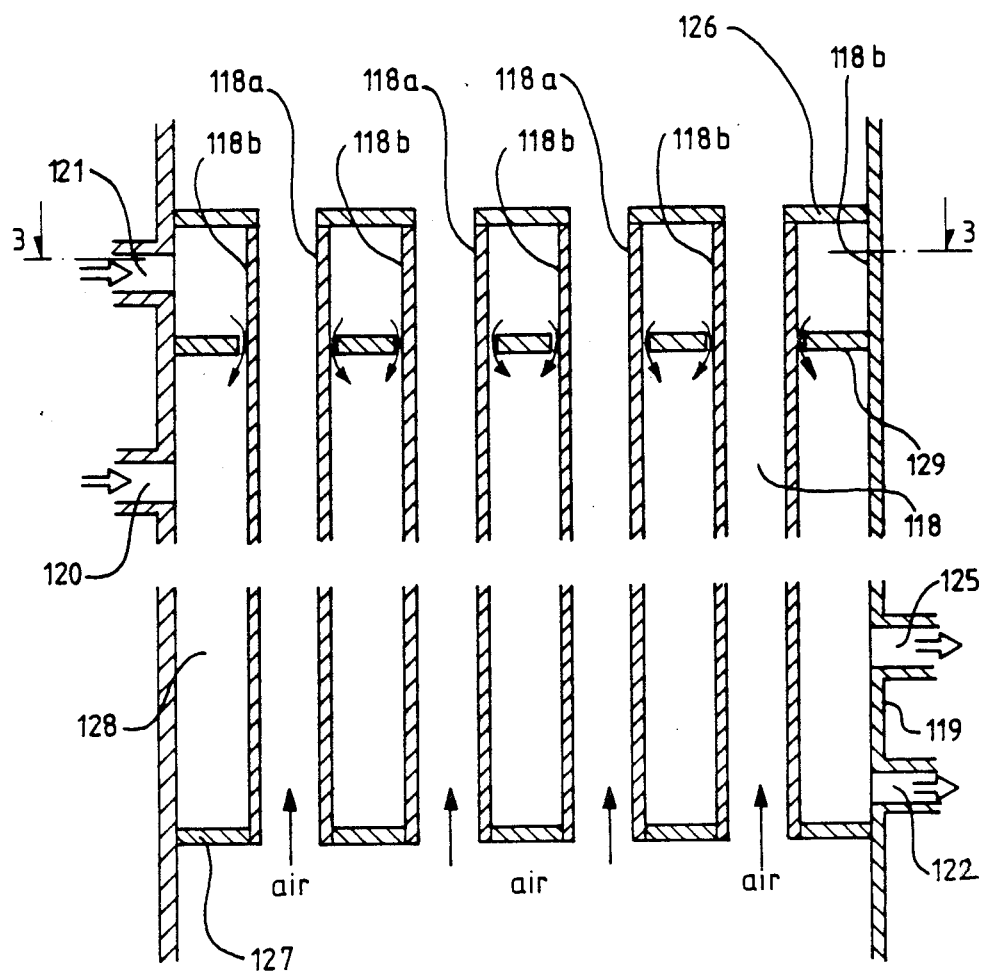
FIG. 2 is a vertical cross-sectional view of condenser 105 of FIG. 1.
Figure 3:
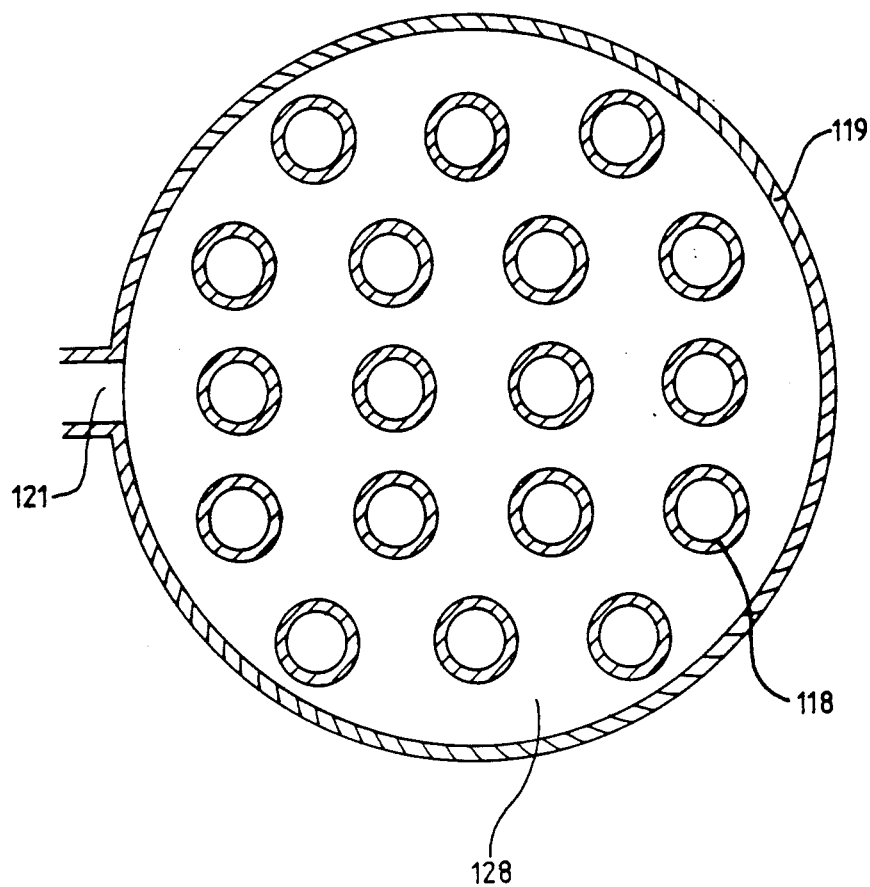
FIG. 3 is a cross-sectional view along the lines 3—3 of the condenser shown in FIG. 2.

As shown in FIGS. 2 and 3, first condenser 105 comprises preferably a plurality of preferably vertically oriented tubular heat exchange elements 118 each having a first inner surface 118a and a second outer surface 118b. The heat exchange elements are enclosed in a casing 119 having an inlet 120 for vapor to be condensed, an inlet 121 for entry of absorption liquid, and an outlet 122 for absorption liquid diluted by condensate from the condensing water vapor. Condenser 105 is further provided with an air inlet 123 and an air outlet 124. An outlet 125 is provided for the removal of uncondensed gases or water vapor. A vacuum pump (not shown) may be connected to outlet 125.

An upper tube sheet or plate 126 and a lower tube sheet 127, to which the upper and lower end of each heat exchange element is attached, form, together with the respective parts of the vertical wall of the casing, an enclosed space 128. A plate 129 is positioned below the upper tube plate so that a gap is formed around the outer surface 118b of the heat exchange elements so that the absorption liquid supplied through inlet 121 is caused to flow down preferably uniformly along the outer surface of each heat exchange element in the form of a thin liquid film. An impeller 130 in the upper end of the casing 119 causes air to be drawn up through the heat exchanger means.

The water vapor released in the flash tank 104 by expansion is passed through conduit 114 to inlet 120 of the condenser 105 communicating with the space around the outer surface of the heat exchange elements 118 defined by upper and lower tube sheets 126 and 127 and the vertical wall of the casing 119. The water vapor contacts the absorption liquid which is discharged from absorption zone 102 through conduit 131, and is passed to inlets 121 and made to flow down preferably uniformly along the outer surfaces 118b of the heat exchange elements.

The water vapor supplied to the condenser 105 through inlet 120 condenses on the outside surfaces of the heat exchange elements and is removed preferably by means of a suitable pump (not shown) along with the absorption liquid through outlet 122. As long as the temperature of the absorption liquid and its concentration are such that the water vapor pressure above the liquid is lower than that of the water vapor, the water vapor will be absorbed by the absorption liquid. Diluted absorption liquid is transferred to evaporator 107 through conduit 132 and 133 via a heat exchanger 134. The heat released by condensation of the water vapor will be taken up by the air following through inlet 123 over the inner-surfaces 118a of the heat exchange elements of condenser 105 and will be removed along with the air exiting through outlet 124.

At least a portion of the absorption liquid which has taken up moisture from the air in absorption stage 101 is discharged through conduit 135 and is directed through a branchconduit 136 to second condenser 106. Second condenser 106 includes preferably a plurality of preferably vertically disposed spaced apart heat exchange elements 137 which are composed of pairs of parallel plates which are connected at their edges to form a plurality of closed spaces within the casing or housing 119. Other conventional heat exchange elements such as tube-type exchangers may also be utilized. Open channels are formed between the heat exchange elements. The interiors of each heat exchange element are connected at their upper end to an inlet 138 for water vapor and at their lower end to an outlet 139 for condensate. Distributors 140 provided with a plurality of openings or spray nozzles extend lengthwise across the housing above each heat exchange element so as to form means for distributing absorption liquid preferably substantially uniformly over the outer surfacess of the heat exchange elements.

Accordingly, a portion of the diluted absorption liquid to be concentrated by evaporation is fed from absorber 101 to second condenser 106 through branchconduit 136 and is introduced into distributor means 140 disposed above each heat exchange element 137 of condenser 106 so as to cause the absorption liquid to flow down preferably in form of a uniform thin film over the outer surface of heat exchange elements 137. Water vapor supplied through conduit 141, preferably connected to the top of housing 142 of evaporator 107 enclosing one or more heat exchange elements 143, is introduced through inlet 138 into heat exchange elements 137. Although the water vapor is preferably taken from evaporator 107, vapor from other sources may also be utilized. Use of the vapor exiting from evaporator 107, however, results in an additional evaporator effect. Thus, if the number of evaporators 107 used is represented by the letter n, the process of the preferred embodiment of the present invention results in n+1 evaporation effects or stages. The absorption liquid flowing down along the outer surfaces of the heat exchange elements 137 will be heated by indirect contact with the hot water vapor exiting from evaporator 107. The air which is supplied through inlet 123 and flowing through the casing 119 on the outside of the heat exchange elements of second condenser 106 will, by direct contact with the absorption liquid, lower the vapor pressure of the absorption liquid and cause evaporation of water therefrom. The water vapor is removed together with the air flowing out from the condenser through the outlet 124. The amount of scavenger air required for cooling the absorption liquid without evaporative cooling is about ten times greater than with evaporative cooling as described. The scavenger air flowing through housing 119 through inlet 123 is thus carefully balanced. Generaly, about 90% of the air introduced into inlet 123 may be withdrawn prior to the air coming into contact with condensers 105 and/or condenser 106. The withdrawn air stream is not indicated in the drawing.

Evaporation of water from the absorption liquid requires heat energy which is removed from the water vapor inside the heat exchange elements 137 causing the vapor to condense therein. At least a portion of the condensate which will form within the heat exchange elements 137 by indirect contact of the water vapor with the absorption liquid is removed through outlet 139 and is passed through conduit 144 to cooler 108 disposed preferably in the lower part of housing 119 as is more fully described below. Another portion of the condensate collected in condenser 106 is fed to distributor 156 through branchconduit 158 for use as a cooling liquid to flow down in form of a thin liquid film preferably uniformly over the inner surfaces 118a of each heat exchange element 118 of condenser 105. Additional cooling water may be added to the system, as required, through inlet 160.

Absorption liquid preconcentrated by evaporation of water therefrom is dropping down into container or vat 145 preferably disposed below the lower ends of the heat exchange elements 137. The preconcentrated absorption liquid is then fed to evaporator 107 through conduit 133 preferably via heat exchanger 134 to raise the temperature thereof prior to the entry into the evaporator by indirect contact with concentrated absorption liquid previously withdrawn from the evaporator.

The evaporator comprises preferably a plurality of heat exchange elements 143 which may be of similar to construction as to those of the condenser 106 having an inlet 146 and an outlet 147 for a heating fluid such as flue gas, hot water or steam. Distributor means 148 disposed above the upper ends of the heat exchange elements 143 supplies absorption liquid preferably uniformly to the outside surface of the heat exchange elements. The absorption liquid will be heated to its boiling point whereupon water will evaporate from the absorption liquid which is flowing down over the surface of the heat exchange elements. The concentrated absorption liquid collected at the bottom of the housing 142 is withdrawn from the evaporator through a discharge conduit 149. At least a portion of the concentrated absorption liquid may be recirculated to the distributor means 148 through conduit 150. The remainder of the concentrated liquid is passed through conduit 151 via the heat exchanger 134, branchconduits 152 to absorption stage 101 via cooler 108 and through branchconduit 153 to absorption stage 102 via heat exchanger 103.

The water vapor generated in casing 142 of evaporator 107 by evaporation of the absorption liquid on the surface of the heat exchange elements 143 is withdrawn from the evaporator and passed through conduit 141 to condenser 106 to be condensed therein and to serve as a heating medium for preconcentrating the absorption liquid.

The absorption liquid fed to cooler 108 is introduced into heat exchange elements 154 which may be of similar design as those of the second condenser 106. The heat exchange elements of the cooler are preferably disposeed below those of the first condenser 105. The absorption liquid is brought into indirect contact with a cooling liquid supplied by a distributor means 157 disposed above heat exchange elements 154 and is caused to flow down in form of a thin liquid film preferably uniformly over the outer surfaces of the heat exchange elements 154. The cooling liquid mainly comprises the condensate from condenser 106. It is an additional advantage of the present invention that the condensate from condenser 106 may be utilized as the cooling liquid on the heat exchange elements of cooler 108 and condenser 105. The use of this condensate is particularly advantageous because it comprises substantially distilled water thus avoiding encrusts and deposits on the heat exchange surfaces of heat exchange elements 154 of cooler 108 and heat exchange elements 118 of condenser 105.

The heat exchange elements of condenser 106, 105 and cooler 108 and the casing 119 preferably form a cooling tower through which air is drawn by means of impeller 130. The air flowing through casing or housing 119 over the outside of the heat exchange elements 154 of cooler 108 in direct contact with the outside surfaces wetted by the cooling liquid will cause evaporation of the cooling liquid. The evaporated water is removed by the air flow. Evaporation of water, in turn, causes removal of heat which is taken from the absorption liquid inside heat exchange elements 154. The cooled absorption liquid is then passed to the first absorption stage 101 through conduit 110.

As pointed out, at least a portion of the condensate exiting condenser 106 may be fed to the space above the upper tube plate 126 of first condenser 105 and caused to flow down as a liquid film over the inner surfaces of heat exchange elements 118 so as to cause evaporative cooling leading to a more efficient cooling process, particularly in combination with the air flow entering housing 119 through inlet 123. Additionally, the humidity and the temperature of the air stream in conduit 109 can be controlled by spray water which is made to evaporate in the air stream.

EXAMPLE 8,100 kg/h of air to be treated is fed to absorbers 101 and 102 through conduit 109 under the following conditions: $t=30/27°$ C.; $x=0.021$; $i=83$ kJ/kg.

About 140 kg/h of water is removed in absorption stages 101 and 102. The temperature in absorption stage 101 is maintained (isothermal absorption) by circulating 37,300 kg/h absorption liquid which has been cooled by about 50,000 kg/h of air in cooler 108. During the cooling step in cooler 108 the condition of the scavenger air has changed as follows: from $t=30/29°$ C.; $x=0.026$ to $t=31.5°/30.5°$ C. and $x=0.031$ before entering first condenser 105.

In condenser 105, water vapor at 15° C. and 0.017 bar is absorbed in an absorption solution having a temperature of about 41° C. which corresponds to that water vapor pressure. The absorbed water adds about 70 kg water to the absorption solution. The absorption solution is then cooled with the scavenger air thereby changing the temperature of the air from 31.5° to about 38° C. No change in the water content of the air will take place as the air passes over the opposite side of the heat exchanger surface rather than over the absorption solution.

The conditions in second condenser 106 may be as follows. The vapor is exiting evaporator 107 in a super heated state at 1 bar and 145° C. In condenser 106 condensation occurs at 1 bar and 100° C. Evaporative cooling is achieved by feeding absorption liquid through distributor 140 over the outer surface of the heat exchange elements 137. The absorption liquid has been preheated by heat exchange (not indicated in the drawing) to about 83° C. and the liquid film over the heat exchange surfaces has reached a temperature of about 88° C. The actual water vapor pressure above the film of absorption liquid will be about 150 mm Hg. 13,700 kg/h of the 50,000 kg/h of scavenger air having passsed over condenser 105 will be passed over condenser 106 resulting in the evaporation and removal of about 90 kg/h of water as vapor. The remainder of the scavenger air is by-passed or withdrawn prior to reaching condensr 106 (not shown in the drawing). The remainder of the water, about 120 kg/h, is evaporated in evaporator 107 and fed to condenser 106. In accordance with the present invention it is thus possible to evaporate about 210 kg/h of water with the energy demand required for the evaporation of about 120 kg/h of water.

It should be understood that the preferred embodiment and example described above is for illustrative purposes only and is not to be construed as limiting the scope of this invention which is properly delineated in the appended claims. While the invention has been herein shown and described as what is presently conceived to be the most practical and preferred embodiment thereof, it will be apparent to those having ordinary skill in the art, that many modifications may be made thereof within the scope of the invention.

What is claimed is:

1. A process for conditioning air comprising:
   directly contacting air in an absorber having a first and second absorption zone with an absorption liquid circulated through said first and second zones, said absorption liquid comprising an aqueous salt solution;
   cooling said absorption liquid circulated through said second absorption zone by indirect contact with circulating cooling water in a heat exchanger;
   discharging said cooling water from said heat exchanger;
   expanding said cooling water discharged from said heat exchanger at reduced pressure to convert at least part of said cooling water into cooling water vapor, and recirculating the remaining cooling water to said heat exchanger;
   condensing said cooling water vapor and absorbing said cooling water vapor into said absorption liquid to dilute said absorption liquid, said absorption liquid having a lower water vapor pressure than said cooling water vapor;
   concentrating said diluted absorption liquid by evaporation in the evaporator; and
   recirculating said concentrated absorption liquid to said absorber.

2. The process of claim 1, wherein said cooling water vapor is absorbed into said absorption liquid on a first cooling surface of a heat exchange element and cooling a second surface in heat exchange relationship with said first surface by an air stream flowing along said second surface.

3. The process of claim 1, further comprising:
   heating at least a portion of said absorption liquid exiting said first absorption zone to the boiling point thereof by indirect heat exchange with a heating fluid in an evaporator to form water vapor;
   condensing said water vapor with a cooling liquid in a condenser;
   utilizing as a cooling liquid in said condenser absorption liquid which is concentrated in said evaporator;
   circulating air through said condenser in contact with said absorption liquid to lower the vapor pressure thereof; and
   recirculating said concentrated absorption liquid from said evaporator to said absorber.

4. The process of claim 3, wherein said absorption liquid is concentrated in said evaporator prior to the utilization thereof as a cooling liquid in said condenser.

5. The process of claim 3, wherein the absorption liquid is concentrated in said evaporator after it has been utilized as a cooling liquid in said condenser.

6. The process of claim 3, further comprising:
   cooling at least a portion of said absorption liquid by bringing said liquid into indirect heat exchange relation with a cooling liquid on a cooling surface;
   utilizing as a cooling liquid on said cooling surface the condensate formed by condensing said water vapor from said evaporator;
   evaporating water vapor from said condensate to an air stream; and
   recirculating said cooled absorption liquid to said absorber.

7. The process of claim 1, wherein said absorption liquid is an aqueous solution comprising potassium acetate, sodium acetate, potassium carbonate, calcium chloride, lithium chloride, or lithium bromide or mixtures thereof.

8. An apparatus for conditioning air comprising:
   an absorber having two absorption zones for directly contacting an air stream with circulating absorption liquid;
   a heat exchanger in communication with said absorber for transferring heat from said absorption liquid circulated through said second absorption zone to a circulating stream of cooling water;
   a flash tank for releasing water vapor from said stream of cooling water;
   first means in communication with said second absorption zone and said flash tank for condensing said water vapor released from said cooling water comprising a first heat exchange element having a cooling surface for condensing and absorbing said water vapor into said absorption liquid;
   means for maintaining a reduced pressure in said tank and over said cooling surface of said first condenser means;
   means for circulating water through said heat exchanger and said flash tank; and
   first passage means for transferring absorption liquid and condensate from said first condenser means to an evaporator for concentrating said absorption liquid.

9. The apparatus of claim 8, further comprising:
   means for evaporating said absorption liquid comprising a second heat exchange element for generating water vapor by vaporization of said absorption liquid exiting said first condenser means;
   said second heat exchange element comprising a first and second surface for concentrating said absorption liquid on said first surface by addition of heat to said second surface of said second heat element;
   second means for condensing absorption liquid comprising a third heat exchange element having a first and a second surface for generating a condensate by condensing vapor on said first surface of said third heat exchange element with transfer of heat to said absorption liquid exiting from said first absorption stage for preconcentration on said second surface of said third heat exchange element;
   means in communication with said second condenser means for introducing an air flow for vaporizing said absorption liquid by simultaneously lowering the water vapor pressure thereof on said second surface of said third heat exchange element;
   second passage means for transferring said preconcentrated absorption liquid from said second condenser means to said evaporator means;
   third passage means for transferring said water vapor from said evaporator means to said second condenser means;
   fourth passage means for transferring said concentrated absorption liquid from said evaporator means to said absorber.

10. The apparatus of claim 9, further comprising means for cooling absorption liquid comprising a fourth heat exchange element having a first and a second surface for cooling said liquid on said first surface of said fourth heat exchange elements with transfer of heat to said condensate on said second surface of said fourth heat exchange element;
    means in communication with said cooling means for introducing an air flow for simultaneously lowering the water vapor pressure of said condensate;

fifth passage means for transferring said condensate from said second condenser means to said cooler means;

sixth passage means for transferring cooled absorption liquid from said cooler means to the said first absorption zone.

11. The apparatus of claim 10, wherein said first heat exchange element of said first condenser means is disposed above said fourth heat exchange element of said cooler means and said third heat exchange element of said second condenser means is disposed above said first heat exchange element, all said heat exchange elements being disposed within the same housing.

12. The apparatus of claim 9, further comprising seventh passage means for transferring said condensate from said second condenser means to said first condenser means.

* * * * *